(12) United States Patent
Schulten et al.

(10) Patent No.: US 12,385,469 B2
(45) Date of Patent: Aug. 12, 2025

(54) METHODS FOR FAST POWER RAMP UP, CONTROLLERS AND WIND TURBINES

(71) Applicant: General Electric Renovables Espana, S.L., Barcelona (ES)

(72) Inventors: Christoph Schulten, Salzbergen (DE); Nithya Anand, Bengaluru (IN); Miriam Monros Garrigosa, Barcelona (ES); Marta Lopez Gonzalez, Barcelona (ES)

(73) Assignee: GE Vernova Renovables Espana, S.L., Barcelona (ES)

( * ) Notice: Subject to any disclaimer, the term of this patent is extended or adjusted under 35 U.S.C. 154(b) by 92 days.

(21) Appl. No.: 18/362,070

(22) Filed: Jul. 31, 2023

(65) Prior Publication Data
US 2024/0035444 A1 Feb. 1, 2024

(30) Foreign Application Priority Data

Aug. 1, 2022 (EP) ..................................... 22382744

(51) Int. Cl.
*F03D 7/00* (2006.01)
*F03D 7/04* (2006.01)
(52) U.S. Cl.
CPC .......... *F03D 7/042* (2013.01); *F05B 2200/11* (2013.01); *F05B 2220/706* (2013.01); *F05B 2270/335* (2013.01)
(58) Field of Classification Search
CPC ........ F03D 7/042; F03D 7/0284; F03D 7/028; F03D 17/00; F03D 80/00; F05B 2200/11; F05B 2220/706; F05B 2270/335; F05B 2270/1033; F05B 2270/309
See application file for complete search history.

(56) References Cited

U.S. PATENT DOCUMENTS

| | | | |
|---|---|---|---|
| 8,872,372 B2 | 10/2014 | Larsen et al. | |
| 10,273,938 B2 | 4/2019 | Kjaer et al. | |
| 10,359,026 B2 | 7/2019 | Yang | |
| 10,495,062 B2 | 12/2019 | Kjaer et al. | |
| 2006/0132993 A1* | 6/2006 | Delmerico | F03D 7/048 361/20 |
| 2013/0249501 A1* | 9/2013 | Lu | H02H 7/12 322/21 |

(Continued)

FOREIGN PATENT DOCUMENTS

EP 2738904 A2 6/2014

OTHER PUBLICATIONS

European Search Report Corresponding to EP22382744 on Jan. 16, 2023.

*Primary Examiner* — Julio C. Gonzalez
(74) *Attorney, Agent, or Firm* — Dority & Manning, P.A.

(57) ABSTRACT

The present disclosure relates to methods (100, 200) for ramping up the power output of a wind turbine (10). A method (100) comprises increasing (110) electric power output from an initial power value (61) at a first power ramp rate (63); and when reaching an intermediate power value (69), increasing (120) the electric power output to a target power value (59) at a second power ramp rate (67) different from the first power ramp rate (63). The intermediate power value (69) is the sum of the initial power value (61) and a predetermined power difference (71).

14 Claims, 5 Drawing Sheets

(56) References Cited

U.S. PATENT DOCUMENTS

| | | | |
|---|---|---|---|
| 2014/0152010 A1* | 6/2014 | Larsen | F03D 7/00 290/44 |
| 2017/0328342 A1 | 11/2017 | Kjaer et al. | |
| 2018/0171974 A1 | 6/2018 | Kjaer et al. | |
| 2019/0055924 A1 | 2/2019 | Kjaer et al. | |

* cited by examiner

METHODS FOR FAST POWER RAMP UP, CONTROLLERS AND WIND TURBINES

The present disclosure relates to methods for operating a de-rated wind turbine, and in particular to methods for ramping up the power output of a wind turbine. The present disclosure further relates to controllers configured to control a wind turbine during power ramp up. The present disclosure further relates to wind turbines configured for such methods of operating.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

In order to maintain the stability of the electrical grid, the production of electric power by the wind turbines and the consumption of electric power of loads connected to the electrical grid must remain balanced. If there is an imbalance, the frequency of the grid may deviate from its prescribed nominal value. For example, if power demand is higher than power production, the frequency of the electrical grid may decrease. And if power production is higher than the demand of power, the frequency of the electrical grid may increase. Typical values of nominal grid frequency are 60 Hertz (Hz) in the US and 50 Hz in Europe. Grid frequency is generally allowed to deviate very little from the nominal frequency within predefined frequency bands. The wind turbines may initiate regulation procedures to restore the stability of the grid if an imbalance, e.g. a frequency imbalance, is detected. In particular, wind farms or individual wind turbines may be requested to reduce power output below their capacity based on the prevailing wind speed. This process is called derating.

Currently, wind farms are operated based on power ramp rates of the particular wind turbines. Each individual turbine may have a power ramp up rate and a power ramp down rate. For example, if power demand decreases, the power output may be ramped down from one level to a lower level. That is to say, the power generated by one or more wind turbines is reduced, e.g. based on a ramp down request, such that the stability of the electrical grid is maintained. Likewise, if power demand increases, the power output may be ramped up from one level to a higher level. The power generated by one or more wind turbines is increased, e.g. based on a ramp up signal, for maintaining the stability of the electrical grid.

Grid codes increasingly require that wind turbines be able to ramp up power quickly. For example, grid codes may require a fast power ramping up from a de-rated power level, which may be as low as e.g. 10% of rated power. This may pose several challenges in the design and operation of wind turbines. In particular, controlling the wind turbine operation in such a manner that in different envisaged grid and wind scenarios, ramp-up can occur quickly enough is challenging.

The present disclosure aims to provide improvements in ramping up power production of wind turbines.

SUMMARY

In an aspect of the present disclosure, a method for operating a wind turbine is provided. The method comprises increasing electric power output from an initial power value at a first power ramp rate. When reaching an intermediate power value, the method further comprises increasing the electric power output to a target power value at a second power ramp rate which is different from the first power ramp rate. The intermediate power value is the sum of the initial power value and a predetermined power difference.

According to this aspect, a de-rated wind turbine outputting a certain power is ramped up at a first power ramp rate until an intermediate power value is reached and then is ramped up at a second different power ramp rate until a target power value is reached. Using two different power ramp rates and switching from the first power ramp rate to the second power ramp rate at an intermediate power value which is the sum of an initial power value and a predetermined power difference may allow to achieve a target power value within a desired or requested time period.

In prior art methods, generally a single power ramp-up rate is followed. Inventors have found however, that a single power ramp-up rate until rated (theoretically available) power can cause problems in the rotational speed of the wind turbine rotor or in the pitch angle control of the wind turbine rotor blades in at least some grid or wind scenarios. Also, the use of a predetermined power difference may help to avoid or at least reduce undesired loads on the wind turbine. In addition, the use of a predetermined power difference may increase efficiency of the power ramp up as measurements, e.g. with wind turbine sensors, and calculations while the power is being ramped up are avoided.

Throughout this disclosure, a power ramp rate may be understood as a rate of change in power production i.e., a first order time derivative of power output that the wind turbine can provide at certain operating conditions. A power ramp rate may be expressed in kilowatts/second in some examples.

Throughout this disclosure, a predetermined power difference may refer to a power value which represents a power difference between an initial power value, at which the power ramp up begins, and an intermediate power value, at which the power ramp rate is changed. The power difference is determined in advance, e.g. immediately before starting to ramp up the power. Therefore, the intermediate power value is known in advance and measurements and/or calculations during ramping up the power do not need to be performed.

In a further aspect of the present disclosure, a method for transitioning a wind turbine operation from a de-rated operation is provided. The method comprises determining an intermediate power value by adding a power difference to a de-rated currently generated power, the power difference being the product of a predefined percentage and an available power value. The method further comprises increasing power generation at a first predefined ramp rate until the intermediate power value is reached. The method further comprises increasing power generation at a second predefined ramp rate until the available power value is reached.

A predefined percentage may refer to a fixed single value of a percentage which is stored in a memory, e.g. a memory of a wind turbine controller. Such a predefined percentage may be determined or programmed before wind turbine operation e.g. during a commissioning phase. Or it may be determined and reprogrammed e.g. through a software upload. A wind turbine is understood to be in normal operation when its rotor is rotating at a speed that is high enough to produce power, the electrical grid is available, and the generator of the wind turbine is producing electric power which is transferred into the electrical grid. A value of a percentage may be predefined before the wind turbine is installed in a wind turbine site in some examples. A value of a percentage may be alternatively predefined during commissioning of the wind turbine. As the percentage is predefined, there is only one value for the percentage. Look-up tables or functions which may lead to different values for the percentage are not used.

In yet a further aspect of the present disclosure, a controller is provided. The controller comprises a communications module, a processor and a memory. The memory comprises instructions that, when executed by the processor, cause the processor to execute the methods of any of the examples disclosed herein. The controller may be a wind turbine controller in some examples.

In yet a further aspect of the present disclosure, a wind turbine is provided. The wind turbine comprises a wind turbine rotor including a plurality of blades, a generator, and a controller configured to perform any of the methods disclosed herein.

DETAILED DESCRIPTION OF EXAMPLES

Figure 1:
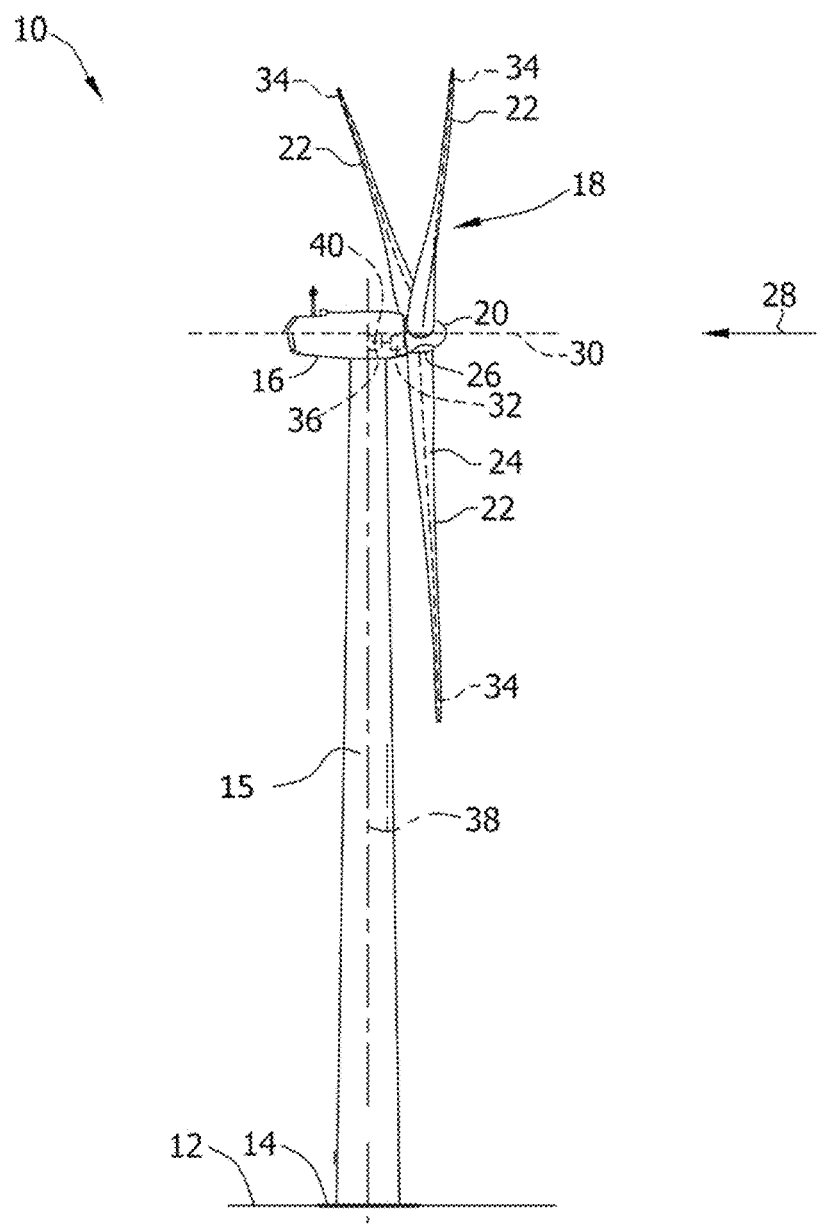
FIG. 1 illustrates a perspective view of one example of a wind turbine.

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, e.g. an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed control system throughout the wind turbine 10, on the support system 14, within a wind farm, and/or at a remote-control center. The wind turbine controller 36 may include one or more processors configured to perform one or more of the steps of the methods described herein. Further, many of the other components described herein include one or more processors. The wind turbine controller 36 may also include a memory, e.g. one or more memory devices.

Figure 2:
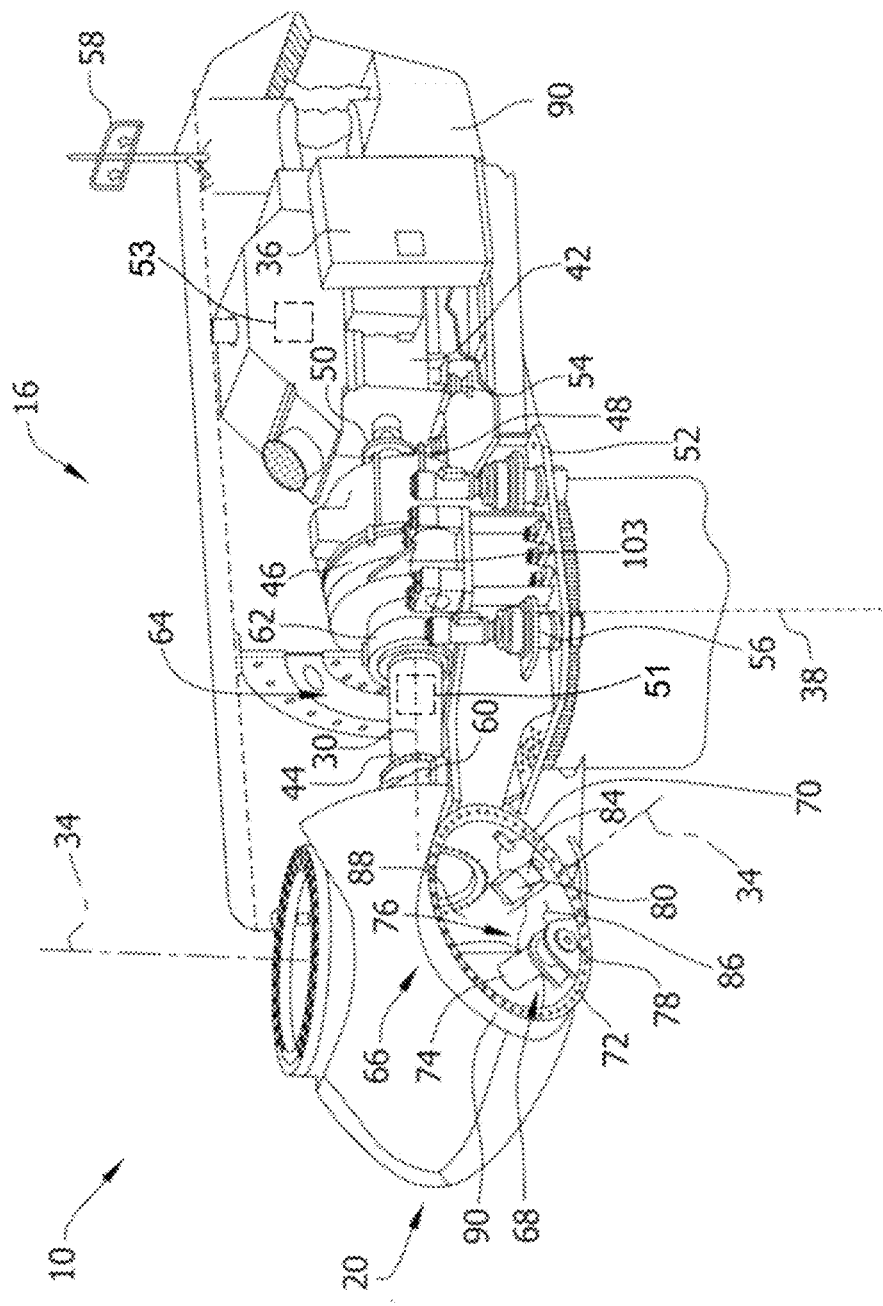
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between e.g. 400V to 1000 V into electrical energy having medium voltage (e.g. 10-35 KV). Offshore wind turbines may have for example generator voltages between 650 V and 3500 V, and transformer voltages may for instance be between 30 kV and 70 kV. Said electrical energy is conducted via power cables from the nacelle 16 into the tower 15.

In some examples, the wind turbine 10 may include one or more shaft sensors 51. The shaft sensors may be configured to monitor at least one of torque loads acting on the main shaft 44 and/or the high-speed shaft 48, and a rotational speed of the shaft 44, 48. In some examples, the wind turbine 10 may include one or more generator sensors 53. The generator sensors may be configured to monitor at least one of a rotational speed of the generator 42 and a generator torque. Shaft sensors 51 and/or generator sensors 53 may include, for instance, one or more torque sensors (e.g., strain gauges or pressure sensors), optical sensors, accelerometers, magnetic sensors, speed sensors and Micro-Inertial Measurement Units (MIMUs).

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drivetrain 64.

In some examples, the wind turbine may be a direct drive wind turbine without gearbox 46. Generator 42 operates at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and an anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electric power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power source 84 provides power to the pitch assembly 66 only during an electric power loss event of the wind turbine 10. The electric power loss event may include power grid loss or dip, malfunctioning of an electrical system of the wind turbine 10, and/or failure of the wind turbine controller 36. During the electric power loss event, the power generator 84 operates to provide electric power to the pitch assembly 66 such that pitch assembly 66 can operate during the electric power loss event.

In the example, the pitch drive system 68, the sensor 70, the pitch control system 80, cables, and the power source 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3A:
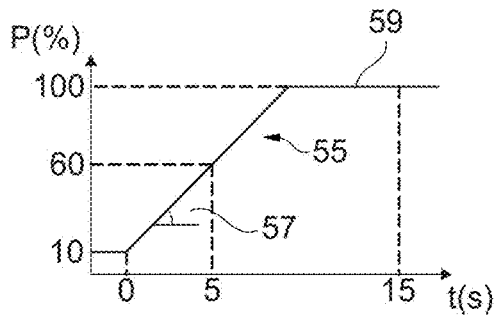
FIGS. 3A and 3B schematically illustrate an example of a passed power ramp up and an example of a failed power ramp up, respectively, when a single ramp rate is used.
Figure 3B:
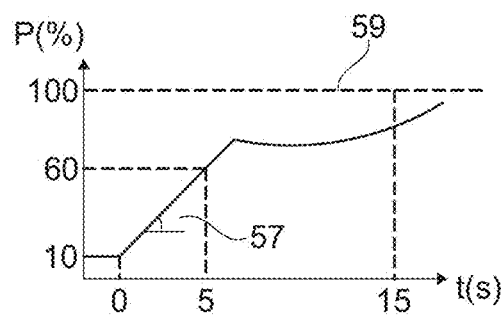

FIGS. 3A and 3B schematically illustrate an example of a prior art wind turbine power ramp up and an example of a failed wind turbine power ramp up, respectively. At the beginning of the scenario of FIGS. 3A and 3B, the wind turbine is operating in a de-rated mode in both FIGS. 3A and 3B. A de-rated wind turbine is controlled to output less power than the wind turbine would be able to provide based on prevailing wind conditions. For example, if power demand from the electrical grid decreases or there is a grid event such as a low voltage or frequency event, the wind turbine may be requested to reduce its power output. The wind turbine may therefore be controlled to ramp its power output down. Therefore, even if the wind turbine was able to output a rated power, i.e. an optimal, possibly maximum, output power for prevailing wind conditions, the wind turbine in the de-rated mode is controlled to output less than the rated power, e.g. a 10% of the rated power, as in the examples of FIGS. 3A and 3B. For example, the wind turbine controller 36 may send instructions to the generator 42 and/or to the power converter to reduce the power output. The wind turbine controller may additionally or alternatively instruct the wind turbine to reduce the rotational speed of the rotor 18.

Rated power as used herein may be understood to be the maximum power that a wind turbine may deliver to the grid under existing wind conditions. For example, a 15 MW wind turbine may have a rated power of 15 MW at wind speeds above the nominal wind speed. The same wind turbine may have a rated power of e.g. 12 MW or 8 MW if the wind speeds are lower. 10% of rated power in this example would correspond to 1.2 MW or 0.8 MW.

In the examples of FIGS. 3A and 3B, a grid code or grid operator may require a de-rated wind turbine 10 to achieve a 60% of a target power value in 5 seconds or less, and to achieve the target power value in 15 seconds or less. Other grid codes may have other requirements.

An electrical grid controller or operator or other may request the wind turbine to ramp up power e.g. after an increase in power demand of the electrical grid or after a grid event has cleared. If the wind turbine had to ramp its power output down, the requirements may be the opposite, i.e. the wind turbine would have to ramp its power output a 60% down in 5 seconds or less, and then to ramp it further down to a 10% of the initial power output in 15 seconds or less. The y axis represents power percentage of a target power value. The target power value may for example be a rated power. Reaching a 100% of the y axes of FIGS. 3A and 3B may therefore refer to the fact that the rated power for a specific wind speed has been achieved. In some examples, if wind speed is high enough, the rated power may be the nominal power of the wind turbine 10, the nominal power referring to the theoretical maximum power output of the wind turbine. In other examples, the rated power may be lower than the nominal power of the wind turbine, e.g. because the prevailing wind speed is insufficient and in particular below nominal wind speed for generating the nominal power of the wind turbine.

As it may be seen in FIG. 3A, the grid code requirements may in theory be met with a single power ramp and a single power ramp rate 57. However, challenges may arise when trying to follow a single power ramp 55. For example, if generator torque is increased for increasing the generation of power, the rotational speed of the wind turbine rotor 18 may tend to decrease. The pitch angle of the blades 22 may be varied, e.g. reduced, with the goal of increasing the rotor speed. However, it may happen in some scenarios that even if the pitch angle is optimized, the rotor speed may still not be high enough for continuing to ramp up the power at the initial power ramp rate 57. This is schematically shown in FIG. 3B, in which after a certain time the power ramp up does not follow the expected straight line of FIG. 3A. Because of an excessively low rotor speed, generator torque would have to be adjusted and the ramp-up occurs slower than desired or expected. Therefore, a target power 59 may not be achieved in a required time.

Although the power continues to increase in the example of FIG. 3B, it is noted that the power may start to decrease for increasing the rotational speed of the wind turbine rotor in other examples. Still in other examples, the wind turbine may disconnect from the electrical grid if the rotational speed of the wind turbine rotor 18 decreases in excess, e.g. below a wind turbine rotor rotational minimum speed threshold.

In an aspect of the present disclosure, a method 100 for operating a wind turbine 10 is provided. The wind turbine 10 comprises a wind turbine rotor 18 including a plurality of blades 22 and a wind turbine generator 42. The wind turbine is configured to be controlled by a controller 36. The controller 36 may be comprised in the wind turbine 10 in some examples, e.g. as illustrated in FIGS. 1 and 2. Although reference is made throughout this disclosure to a wind turbine controller 36, it should be clear that a controller 36 which is not included in a wind turbine 10 is also covered by the disclosure. E.g. a controller may be a wind farm controller or other remote control system.

Figure 4:
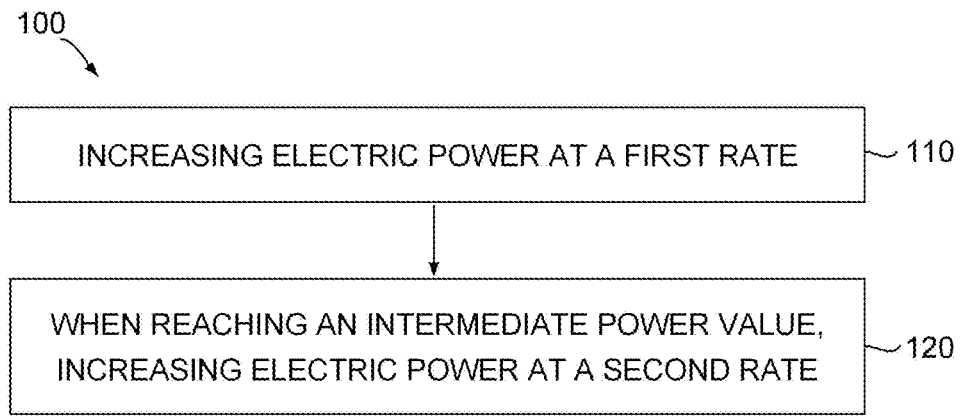
FIG. 4 shows a flow chart of an example of a method for operating a wind turbine.
Figure 5:
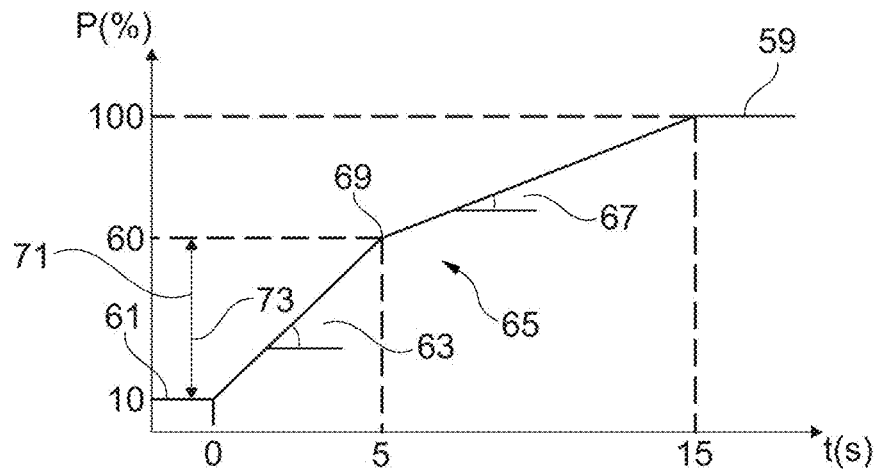
FIG. 5 schematically illustrates an example of a power ramp up with a dual ramp rate.

Method 100 is schematically shown in the flow chart of FIG. 4. FIG. 5 schematically illustrates an example of a power ramp up 65 with a dual power ramp rate 63, 67. The power output in axis y of FIG. 5 is represented as a percentage of a rated power, as in FIGS. 3A and 3B. The x axis represents time.

The method comprises, at block 110, increasing electric power output from an initial power value 61 at a first power ramp rate 63. The method further comprises, at block 120, when reaching an intermediate power value 69, increasing the electric power output to a target power value 59 at a second power ramp rate 67 which is different from the first ramp rate 63.

The intermediate power value 69 is the sum of the initial power value 61 and a predetermined power difference 71. The power difference 71 may be the product of a predefined percentage 73 and the target power value 59 in some examples. As power is represented as a percentage of rated power in the example of FIG. 5, the power difference 71 is equal to the predefined percentage 73.

A de-rated wind turbine, i.e. a wind turbine 10 being operated in a de-rated control mode, may in this manner ramp up power in a fast and reliable manner. Instead of using a single power ramp 55 as in the example of FIG. 3A, the wind turbine controller 36 controls the wind turbine to first increase the generated power up to an intermediate power value 69 at a first power ramp rate 63, and after the intermediate power value 69 is reached, the wind turbine controller 36 controls the wind turbine to increase the generated power up from the intermediate power value 69 to the target power value 59 at a second power ramp rate 67.

Figure 6:
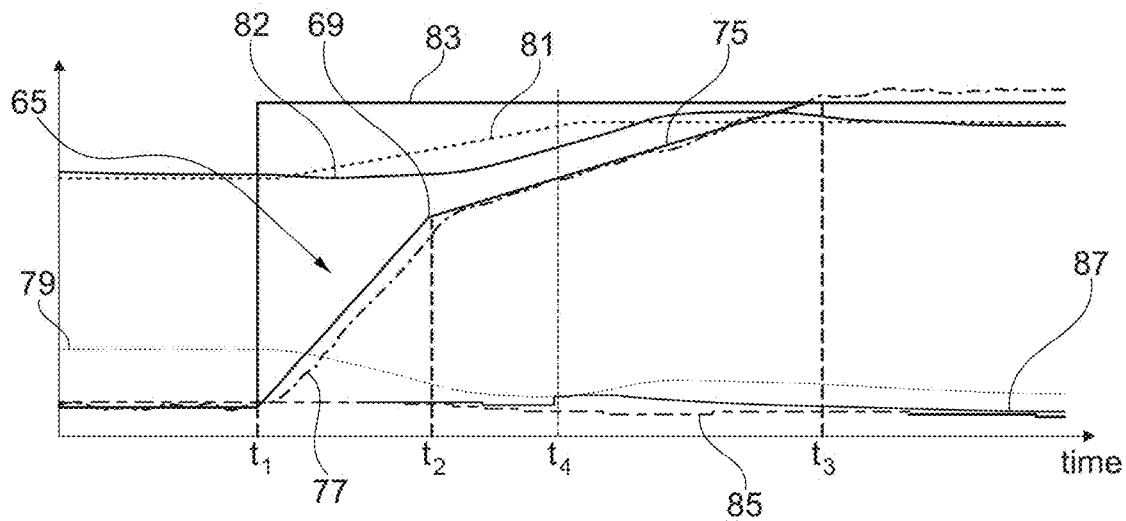
FIG. 6 schematically illustrates the example of the power ramp up of FIG. 5 with a simulated actual power ramp up and some related control parameters.

By using two different ramp rates 63, 67, the wind turbine 10 may be controlled such that limitations of one or more parameters preventing reaching the target power value 59 in a required time period, e.g. 15 seconds in FIGS. 3A, 3B and 5 or t3-t4 in FIG. 6, may be avoided. For example, a sufficiently high rotational speed of the wind turbine rotor 18 may be maintained during all the ramp up process, thereby avoiding wind turbine disconnection or a power decrease in response to an insufficient rotational speed of the wind turbine rotor. At the same time, power ramp-up may be quick by choosing the first ramp rate relatively high in some examples.

Also, as the power difference 71 is predetermined, e.g. it may be calculated as the product of a suitable predefined percentage 73 and the target power value 59, the power ramp up 65 may be faster and easier to implement and tailor to specific needs, e.g. in comparison to power ramp up methods which perform measurements and adjust the power ramp up based on those measurements. The use of a predetermined power difference 71 may also help to reduce undesired loads on the wind turbine. The combination of two different power ramp rates and an intermediate power value 69 based on a predetermined power difference 71 may allow for a successful and fast power ramp up.

The intermediate power value 69 may be determined at the beginning of the power ramp up, e.g. immediately before starting to ramp up power. The wind turbine controller 36 may e.g. receive an external power request, i.e. a specific target value 59, or a command to return to normal operation and the wind turbine controller 36 may determine the intermediate power value 69 based on the predefined percentage 73. The wind turbine controller 36 may then control the wind turbine 10 for achieving the intermediate power value 69.

FIG. 6 schematically illustrates an example of a simulation of a power ramp up 65 with a dual ramp rate according to an example of the present disclosure. The y axis indicates an increase or a decrease of the magnitude of the different parameters represented in FIG. 6. The x axis represents time. In terms of ramping up power, t1 may represent 0 seconds (i.e. the moment at which a signal is received or a determination is made to increase power production in accordance with possibilities), t2 may represent 5 seconds later than t1 and t3 may represent 15 seconds later than t1 in some examples.

Before a time t1, the wind turbine 10 is generating a certain amount of electrical power which is less than a maximum amount of power which could be generated for prevailing wind conditions, e.g. a 10% of a rated power. Two lines are illustrated for power: a power setpoint 75 and an actual power output 77. A pitch setpoint 79 for the wind turbine blades is also indicated. A rotor speed setpoint 81 and an actual rotor speed 82 are also indicated. The actual rotor speed 82, the pitch angle and the power output 77 are maintained as constant as possible before time t1.

In the example of FIG. 6, the rotor speed setpoint 81 is kept at or above a minimum rotor speed threshold before increasing the electric power output from the initial power value 61. I.e., the speed of wind turbine rotor is limited downwards before t1 such that the rotor speed cannot fall below a certain value. The minimum rotor speed threshold may be a predefined value in some examples.

At time t1, the wind turbine controller 36 becomes aware that the power output has to be ramped up. In some examples, an external power request of the target power value 59 may be received by a controller 36 configured to control the wind turbine 10, e.g. the wind turbine controller 36. A wind farm controller, a substation controller, a wind farm operator, or any suitable controller or operator may send the request of outputting the target power value 59. In this or other examples, an end of an electrical grid event may be detected. For instance, if the frequency of the electrical grid has increased above a frequency threshold, or the voltage of the electrical grid has decreased above a voltage threshold, the wind turbine controller 36 may detect, e.g. via the wind turbine power converter, when the grid event is over.

Once the wind turbine controller 36 knows that the power has to be ramped up, the intermediate power value 69 may be determined. In some examples, the predefined percentage 73 may be between 30% and 70%, specifically between 40% and 60%, and more specifically about 50%. An intermediate power value 69 obtained as a percentage of 40% to 60% of the target power value 59 may allow to reach the target power value in the necessary time interval without excessively loading or stressing the wind turbine 10. The predefined percentage may be programmed in the wind turbine controller 36 e.g. during commissioning of the wind turbine.

The wind turbine may then be controlled to reach the intermediate power value 69. The power is increased at the first power rate 63. In the example of FIG. 6, the rotor speed setpoint 81 is increased. The pitch angle setpoint 79 is decreased for increasing the rotor speed, and therefore the power output. In general, the pitch angle control may be programmed to respond to rotor speed variations and to maintain a rotor speed as close as possible to a target. The torque applied to the wind turbine generator 42 can also be controlled, e.g. increased, for increasing the rotor speed and the power output.

When the intermediate power value 69 is achieved at a time t2, the power continues to be ramped up, but at a second power ramp rate 67 different from the first power ramp rate 67. Again, suitable setpoints for the rotor speed 81 and the pitch angle 79 are provided. The target power value 59 is achieved at a time t3. Two time periods can be differentiated: a first time period t241 and a second period t3-t2. In the example of FIG. 6, the rotor speed power setpoint is increased during a first portion of the second period (between t3 and t4, see FIG. 6) and then it is kept constant. The pitch setpoint is decreased during that time interval and it is then increased. Again, the torque applied to the generator 42 can also be controlled to provide a suitable power output. In the specific example of FIG. 6, a thrust experienced by the wind turbine rotor 18 may become too high around t4, and the pitch setpoint 79 may be varied, e.g. increased, for controlling the thrust.

At least one of the first power ramp rate 63 and the second power ramp rate 67 may be a predefined power ramp rate. In some examples, both the first and second power ramp rates may be predefined power ramp rates. Similarly to the predefined percentage 73 used for calculating the intermediate power value 69, predefined power ramp rates may allow for a faster control of the wind turbine while it may be ensured that the target power value 59 is achieved within a desired time period. The first 63 and/or second 67 power ramp rates may specifically be predefined, e.g. with the aid of computer simulations, for achieving a target power value at the end of the time period provided by a specific grid code, or before but close to the end of the time period provided by the grid code. Excessive and unnecessary wind turbine stress may be avoided.

In other examples, the first and/or second ramp rates may be chosen from predefined look-up tables or power curves. This may improve the adaptability of the power ramp rates to prevailing conditions such as wind speed.

The second power ramp rate 67 may be lower than the first power ramp rate 63 in some examples. A fast increase in output power followed by a slower increase in output power may ensure that a target power value 59 is obtained in the required time period while the wind turbine is not stressed more than necessary. In some examples, an estimation function for estimating how close one or more parameters, e.g. generator speed, pitch angle or others, are to their limits may be used to choose a second power ramp up rate 67 which is lower than the first power ramp up rate 63.

The power output limit 83, i.e. a top or upper limit for the power setpoint, may in some examples be determined as the product of a prevailing wind turbine rotor speed value and a maximum torque value. The maximum torque value refers to the maximum torque of the wind turbine generator of a torque—wind turbine rotor speed curve. Calculating the power setpoint limit during the power ramp up in this way may ensure that the target power value is reached while operating in the de-rated control mode with a reduced wind turbine rotor speed.

In some examples, one of one or more controller gains for power and one or more controller gains for generator torque may be different from the corresponding controller gains during normal operation. In some examples, one or more controller gains for power and/or for generator torque may be adapted during the power ramp up. Adjusting the gains, e.g. proportional, integral, and derivative gains of power, and/or pitch and/or torque control, may accelerate the power ramp up. The gains may be adjusted such that the controller 36 tries hard to minimize an error between the setpoints 75 and the current values 77. In some of these examples, a first set of controller gains for power and generator torque is provided for the power ramp up at the first power ramp rate and a second different set of controller gains is provided for the power ramp up at the second power ramp rate. By providing separate gains for the first ramp up and the for the second ramp up, the setpoints may be better followed.

In some examples, the method may comprise refraining from performing oscillation damping actions while increasing electric power output from the initial power value to the target power value, i.e. during power ramp up. I.e., damping actions are not performed while the power is ramped up at the first 63 and at the second 67 ramp rates. For example, the oscillations of the tower 15 and the oscillations of the drivetrain 64 may temporarily not be mitigated. In other words, the oscillations are allowed to reach higher levels before the wind turbine controller takes actions to actively reduce the oscillations during a power ramp up. The power ramp-up may be smoother without such damping actions as for example generator torque is not varied for acting on the drivetrain 64 oscillations, which may produce power spikes. Damping of these oscillations may be activated when the target power value has been reached.

Figure 7:
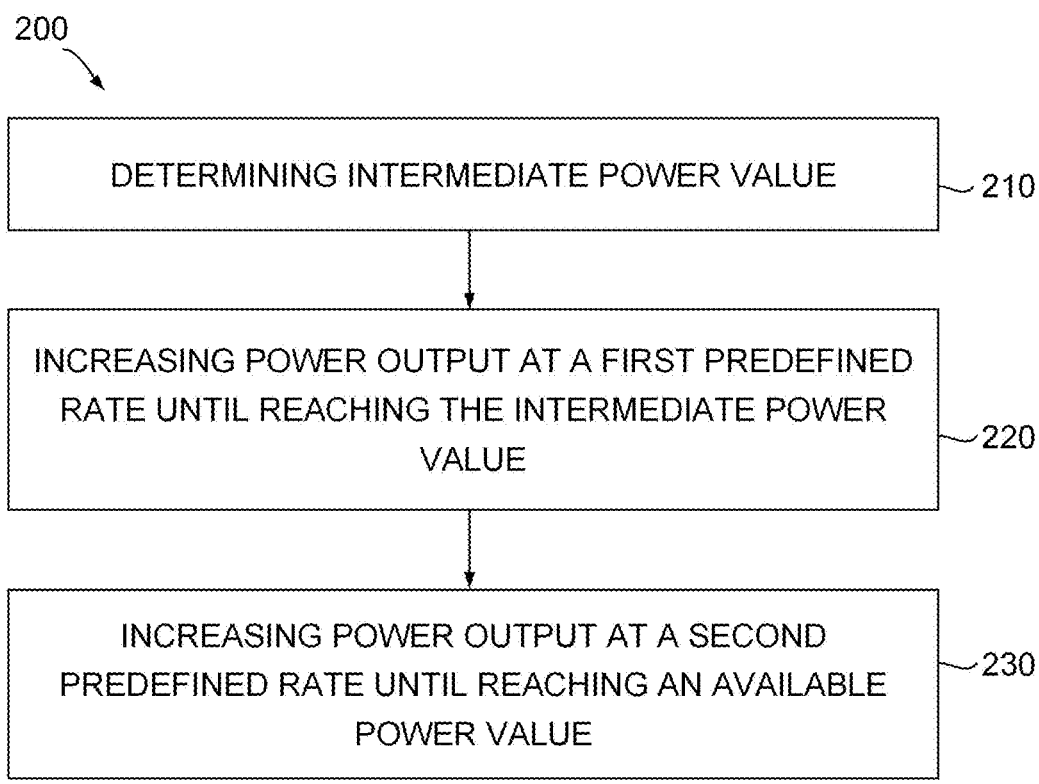
FIG. 7 shows a flow chart of another example of a method for operating a wind turbine.

In a further aspect of the disclosure, a method 200 for transitioning a wind turbine 10 operation from a de-rated operation to normal operation is provided. Method 200 is shown in the flow chart of FIG. 7. Aspects and explanations with respect to method 100 may be combined and applied to method 200 and vice versa.

The method comprises, at block 210, determining an intermediate power value 69 by adding a power difference 71 to an instantaneous power output in de-rated operation, the power difference 71 being the product of a predefined percentage 73 and an available power value 59. In some examples, the predefined percentage 73 may be between 40% and 60%.

The method further comprises, at block 220, increasing power output at a first predefined ramp rate 63 until the intermediate power value 69 is reached.

The method further comprises, at block 230, increasing power output at a second predefined ramp rate 67 until the available power value 59 is reached.

In some examples, a first set of predefined controller gains for power and for torque may be provided for the increase of power generation at the first predefined ramp rate 63 and a second different set of predefined controller gains for power and for torque may be provided for the increase of power generation at the second predefined ramp rate 67.

In some examples, control modes or algorithms for drivetrain 64 damping and/or tower 15 damping may be turned off or bypassed during power ramp up.

In some examples, the method 200 may further comprise bypassing a thrust limit.

In a further aspect of the disclosure, a controller 36 is provided. The controller may be a PID controller. The controller 36 comprises a communications module 43, a processor 40 and a memory 41. The memory comprises instructions that, when executed by the processor, cause the processor to execute the steps of method 100 or method 200. The controller 36 may be a wind turbine controller.

Figure 8:
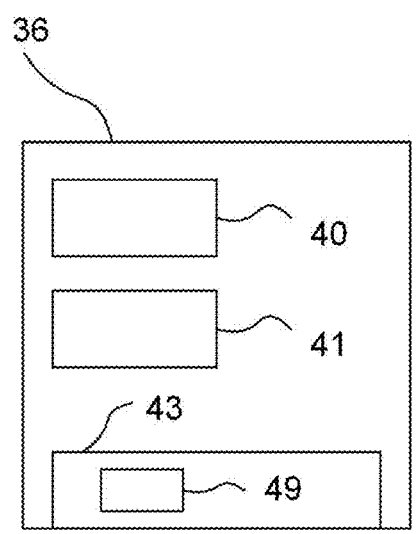
FIG. 8 schematically illustrates an example of a controller.

FIG. 8 schematically illustrates an example of a controller 36, e.g. a wind turbine controller. The controller 36 is configured to perform one or more of the methods, steps, determinations and the like disclosed herein. The controller 36 comprises a processor 40. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably throughout this disclosure.

The controller 36 also includes a memory 41, e.g. one or more memory devices. A memory 41 may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 41 may generally be configured to store suitable computer-readable instructions that, when implemented by the processor(s) 40, configure the controller 36 to perform, or trigger the performance of, various steps disclosed herein. A memory 41 may also be configured to store data, e.g. predefined data or data from measurements and/or calculations.

Additionally, the controller 36 also includes a communications module 43 to facilitate communications between the controller 36 and the various components of the wind turbine 10. For instance, the communications module 43 may serve as an interface to permit the turbine controller 36 to transmit control signals to a pitch drive system 66 for controlling the pitch angle of the rotor blades 22 or to a generator 42 or power converter for controlling generator torque and power output. The communications module 43 may be configured to communicatively connect the controller 36 with other elements of the wind turbine 10. Connecting may be carried out via a wired connection and/or via a wireless connection, e.g. by using any suitable wireless communications protocol known in the art. Moreover, the communications module 43 may include a sensor interface 49, e.g. one or more analog-to-digital converters, to permit signals transmitted from one or more sensors 51, 53, 58 to be converted into signals that can be understood and processed by the processors 40.

In some examples, the controller 36 may be configured to change a control mode during power ramp up when a pitch setpoint value equals a minimum optimum pitch value and when the wind turbine rotor speed is decreasing. The risk of changing to another control mode during the power ramp up may therefore be reduced. FIG. 6 shows a minimum optimum pitch line 85. A minimum optimum pitch value may be understood as a pitch angle which provides an optimum aerodynamic efficiency for a given wind speed. The minimum optimum pitch line does not include the effect of thrust. If the effect of thrust was included, a fine pitch line 87 would be obtained.

In a further aspect of the disclosure, a wind turbine 10 is provided. The wind turbine comprises a rotor 18 having a plurality of wind turbine blades 20, a generator 42 configured to supply power to an electrical grid and a controller 36 configured to carry out any of the methods hereinbefore described.

This written description uses examples to disclose a teaching, including the preferred embodiments, and also to enable any person skilled in the art to put the teaching into practice, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for operating a wind turbine, the method comprising:
increasing electric power output of the wind turbine from an initial power value at a first power ramp rate;
when reaching an intermediate power value, increasing the electric power output to a target power value at a second power ramp rate that is different from the first power ramp rate;
wherein the intermediate power value is the sum of the initial power value and a predetermined power difference; and
wherein the predetermined power difference is a predefined percentage of the target power value that is determined prior to the step of increasing electric power output of the wind turbine at the first power ramp up rate.

2. The method of claim 1, wherein the predefined percentage is between 30% and 70%.

3. The method of claim 1, wherein at least one of the first power ramp rate or the second power ramp rate is a predefined power ramp rate.

4. The method of claim 1, wherein the second power ramp rate is lower than the first power ramp rate.

5. The method of claim 1, wherein while increasing the electric power output from the initial power value to the target power value, a power output limit is determined as a product of a prevailing wind turbine rotor speed value and a maximum torque value.

6. The method of claim 1, wherein while increasing the electric power output from the initial power value to the target power value, one or more controller gains for power or one or more controller gains for generator torque is different from respective corresponding controller gains during normal operation.

7. The method of claim 6, wherein a first set of controller gains for power and generator torque is provided for the power ramp up at the first power ramp rate and a second different set of controller gains is provided for the power ramp up at the second power ramp rate.

8. The method of claim 1, further comprising refraining from performing oscillation damping actions while increasing the electric power output from the initial power value to the target power value.

9. The method of claim 1, wherein a rotor speed setpoint is kept at or above a minimum rotor speed threshold before increasing the electric power output from the initial power value.

10. The method of claim 1, wherein an external power request of the target power value is received by a controller configured to control the wind turbine.

11. The method of claim 1, further comprising detecting an end of an electrical grid event.

12. A controller for operation of a wind turbine, comprising:
a communications module;
a processor;
a memory, wherein the memory comprises instructions that, when executed by the processor, cause the processor to execute the method of claim 1 for operating the wind turbine.

13. The controller of claim 12, wherein the controller is configured to change a control mode during power ramp up when a pitch setpoint value equals a minimum optimum pitch value and when the wind turbine rotor speed is decreasing.

14. A wind turbine, comprising:
a wind turbine rotor including a plurality of wind turbine blades;
a generator;
a controller, the controller further comprising:
a communications module;

a processor;
a memory, wherein the memory comprises instructions that, when executed by the processor, cause the processor to execute the method of claim 1 for operating the wind turbine.

\* \* \* \* \*